(12) United States Patent
Li et al.

(10) Patent No.: US 8,132,257 B2
(45) Date of Patent: Mar. 6, 2012

(54) ANTI-VIRUS METHOD BASED ON SECURITY CHIP

(75) Inventors: Jun Li, Beijing (CN); Kai Wang, Beijing (CN); Rongfeng Feng, Beijing (CN); Na Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 624 days.

(21) Appl. No.: 12/159,334

(22) PCT Filed: Mar. 23, 2006

(86) PCT No.: PCT/CN2006/000477
§ 371 (c)(1),
(2), (4) Date: Sep. 11, 2008

(87) PCT Pub. No.: WO2007/085137
PCT Pub. Date: Aug. 2, 2007

(65) Prior Publication Data
US 2009/0144582 A1    Jun. 4, 2009

(30) Foreign Application Priority Data

Dec. 30, 2005  (CN) .......................... 2005 1 0136600

(51) Int. Cl.
*G06F 11/00* (2006.01)
(52) U.S. Cl. ................ 726/22; 726/23; 726/24; 726/25; 713/187
(58) Field of Classification Search ............. 726/22–25; 713/187
See application file for complete search history.

(56) References Cited

U.S. PATENT DOCUMENTS

| 5,421,006 | A | 5/1995 | Jablon et al. |
| 5,537,540 | A * | 7/1996 | Miller et al. ............... 714/38.13 |
| 5,944,821 | A | 8/1999 | Angelo |
| 6,021,510 | A | 2/2000 | Nachenberg |
| 6,185,678 | B1 | 2/2001 | Arbaugh et al. |
| 6,240,530 | B1 | 5/2001 | Togawa |
| 6,711,675 | B1 | 3/2004 | Spiegel et al. |
| 2002/0147918 | A1* | 10/2002 | Osthoff et al. ................ 713/193 |
| 2004/0059925 | A1* | 3/2004 | Benhammou et al. ........ 713/189 |
| 2006/0036857 | A1* | 2/2006 | Hwang ......................... 713/168 |

(Continued)

FOREIGN PATENT DOCUMENTS
JP            10-333902 A     12/1998
(Continued)

*Primary Examiner* — Christopher Brown
(74) *Attorney, Agent, or Firm* — Dickstein Shapiro LLP

(57) ABSTRACT

An anti-virus method based on a security chip according to the present invention is provided. The method comprises the following steps: a hash value obtained by a hashing operation for a computer key file and a system control program are stored in a memory of the security chip, and a backup file of the computer key file is stored in a backup storage area. When power up, the integrity of the system control program is verified by using the hash value of the system control program stored in the memory of the security chip. If the system control program is integral, a control is executed by the system control program, and the system control program verifies the integrity of the computer key file using the hash value of the computer key file stored in the memory of the security chip. If all the computer key files are integral, the operating system is started; on the contrary, if any of the computer key file is not integral, it will be restored using the backup file of the computer key file stored in the backup storage area.

11 Claims, 2 Drawing Sheets

U.S. PATENT DOCUMENTS

| | | | |
|---|---|---|---|
| 2006/0155988 A1* | 7/2006 | Hunter et al. | 713/164 |
| 2006/0161975 A1* | 7/2006 | Diez et al. | 726/18 |

FOREIGN PATENT DOCUMENTS

| | | | |
|---|---|---|---|
| JP | 11-085503 A | 3/1999 | |
| JP | 2001-500293 T | 1/2001 | |
| JP | 2004-265286 A | 9/2004 | |
| WO | WO-98/10611 | 3/1998 | |
| WO | WO-00/73904 | 12/2000 | |

* cited by examiner

ANTI-VIRUS METHOD BASED ON SECURITY CHIP

BACKGROUND OF THE INVENTION

1. Field of Invention

The present invention relates to an anti-virus method based on a security chip. By taking the security chip as a trusted root, a computer key file such as a BIOS code file, a MBR code file, a trusted file, etc is made a safe backup and intelligently restored, and a function for monitoring a file is executed when an operating system is run, so as to implement a safe start of the operating system. Therefore, the running of a malicious program is avoided, in order to achieve a purpose for defending known and unknown viruses.

2. Description of Prior Art

Currently, there are various solutions for achieving similar purpose. For example, in a common anti-virus method known in the prior art, a virus scanning engine is used to scan and monitor memory and hard disk files; a comparison is made according to a signatures database; and an alarm and a clean-up operations are performed when a virus is found. However, the disadvantage of this method is that only known viruses may be found, and processes before and during which the operating system is started could not be monitored, since this method works after the operating system is started.

There is also an operating system restoration method. In this method, a kernel file of the operating system is made a backup by using HPA of a hard disk. When the kernel file and the backup file are verified not in accordance with each other, a user is prompted to make a restoration or backup. The disadvantage of this method is that it doesn't take TPM security chip technique and is lack of security, while there are so many possibilities of HPA being attacked or changed and it is also hard to find backup files has being tampered.

Therefore, an anti-virus method based on a security chip is desirable, which could prevent a malicious program from running before and during the operating system is started, so as to implement the purpose for defending known and unknown viruses.

SUMMARY OF THE INVENTION

The present invention is proposed in order to overcome defects in the prior art. An object of the present invention is to provide an anti-virus method based on a security chip. By taking the security chip as a trusted root, a computer key file such as a BIOS code file, a MBR code file, a trusted file, etc is made a safe backup and intelligently restored, and a function for monitoring a file is executed when an operating system is run, so as to implement a safe start of the operating system. Therefore, the running of a malicious program is avoided, in order to achieve a purpose for defending known and unknown viruses.

For achieving the object of the present invention as discussed above, an anti-virus method based on a security chip is provided according to the present invention. The method comprises steps of: storing, in a memory of the security chip, a hash value obtained by a hashing operation for a computer key file and a system control program; and storing, in a backup storage area, a backup file of the computer key file; verifying the integrity of the system control program by using the hash value of the system control program stored in the memory of the security chip, when power up; if the system control program is integral, executing a control, and verifying the integrity of the computer key file, by the system control program, with the hash value of the computer key file stored in the memory of the security chip; and if all the computer key files are integral, starting an operating system; on the contrary, if any of the computer key files is not integral, restoring the computer key file by using the backup file of the computer key file stored in the backup storage area.

Preferably, the computer key file comprises a BIOS code file, a MBR code file, and trusted files.

Preferably, the step of verifying the integrity of the computer key file by the system control program using the hash value of the computer key file stored in the memory of the security chip comprises a step of: verifying integrity of the BIOS code file, the MBR code file and the trusted file sequentially, by the system control program, with hash values of the BIOS code file, the MBR code file and the trusted file stored in the memory of the security chip.

Preferably, the backup storage area is a hard disk protected area.

Preferably, the method further comprises steps of: when operating system is started, verifying the integrity of the trusted file in real-time, by the system control program, using the hash value of the trusted file stored in the memory of the security chip; if the trusted file is integral and a file which is to be run exists in a trusted list, allowing the running of the file which is to be run; otherwise, forbidding the running of the file which is to be run.

Preferably, the step of verifying the integrity of the system control program by using the hash value of the system control program stored in the memory of the security chip comprises steps of: obtaining a hash value of current system control program by performing a hashing operation which is the same as said hashing operation for the current system control program; comparing this hash value with the hash value of the system control program stored in the memory of the security chip; and if the two hash values are in accordance with each other, the current system control program is integral.

Preferably, the step of verifying the integrity of the computer key file with the hash value of the computer key file stored in the memory of the security chip comprises a step of: obtaining a hash value of a current computer key file by performing a hashing operation which is the same as said hashing operation for the current computer key file; comparing the hash value with the hash value of the computer key file stored in the memory of the security chip; and if the two hash values are in accordance with each other, the current computer key file is integral.

Preferably, the hash value stored in the memory of the security chip is obtained by performing the hashing operation twice.

Preferably, two hashing functions are identical in the hashing operation which is performed twice.

Preferably, two hashing functions are different in the hashing operation which is performed twice.

Preferably, the trusted file is a clean operating system core file.

Preferably, the memory of the security chip is protected by authentication of the security chip.

BRIEF DESCRIPTION OF THE DRAWINGS

Hereinafter, the present invention will be further described in detail by referring to the drawings and the preferred embodiments in order to make the objects, technical scheme and advantages of the present invention more apparent. In the figures.

code file, a MBR (Main Boot Record) code file and a trusted file in order to implement an anti-virus method based on the security chip.

DETAILED DESCRIPTION OF PREFERRED EMBODIMENTS

Figure 1:
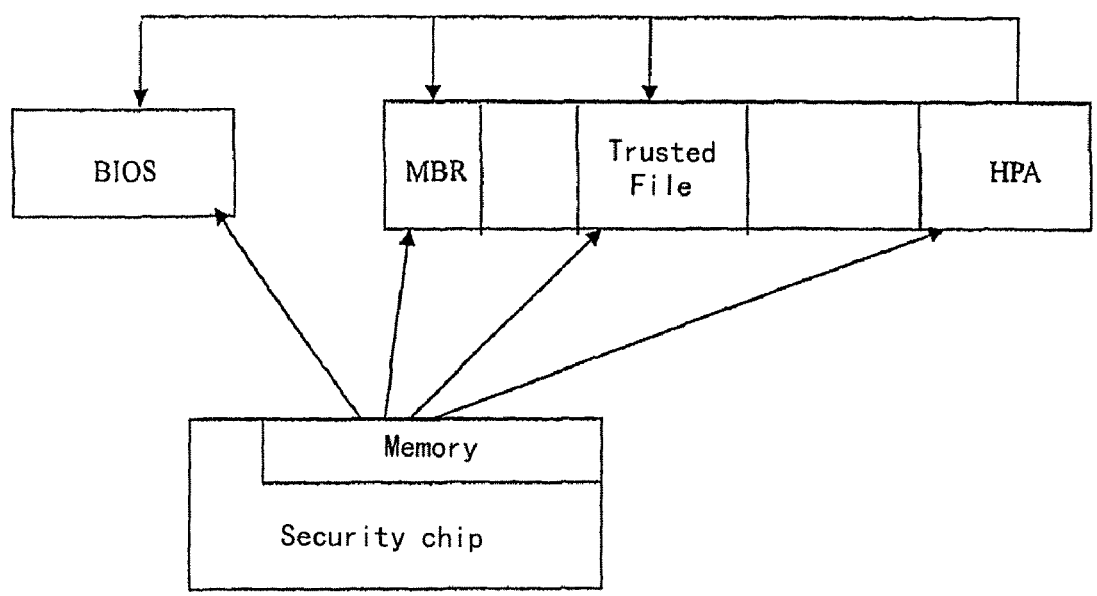
FIG. 1 is an illustrative diagram showing relationships between contents stored in a memory of a security chip and a HPA storage area and a BIOS (Basic Input Output System)

The technical principle of the present invention is in that: by taking a security chip as a trusted root, an integrity check is performed to respective sectors during the start of a system, and a trusted relationship is transferred to establish a trusted computing environment for a whole computer system, thereby to achieve an anti-virus purpose.

A preferred embodiment according to the present invention will be described by referring to the drawings.

FIG. 1 is an illustrative diagram showing relationships between contents stored in a memory of a security chip and a HPA storage area and a BIOS code file, a MBR code file and a trusted file (a computer key file) in order to implement an anti-virus method based on the security chip.

As shown in FIG. 1, a correct BIOS code file and its hash value are pre-stored in a hard disk protect area (HPA area, which is also called a hard disk hidden area), and the HPA could not be accessed by a common user. Additionally, it is well known in the art that the HPA area is used as a data protected area. Then, a hash value obtained by further performing a hashing operation for the original hash value is stored in a memory of a security chip. That is to say, a hash value obtained by performing the hashing operation twice for the BIOS code file is stored in the memory of the security chip as illustrated in FIG. 1. The memory of the security chip is protected by the security chip, and may be accessed only if an authorization and an authentication from an owner of the security chip are obtained. Herein, the security chip technique is also well known in the prior art, the description of which is omitted.

Similarly, a correct MBR code file and its hash value are pre-stored in the HPA area, and a hash value obtained by further performing a hashing operation for the original hash value is stored in a memory of a security chip.

Similarly, a trusted file list is pre-created. Trusted files (they are mainly clean operating system core files) in the list and their hash value are pre-stored in the HPA area, and hash values obtained by further performing a hashing operation for the original hash values of the trusted file are stored in a memory of a security chip.

Finally, a system control program file and its hash value are also stored in the HPA area, and a hash value obtained by further performing a hashing operation for the original hash value is stored in a memory of a security chip.

In summary, hash values obtained by performing the hashing operation once for the BIOS code file, the MBR code file, the trusted file and the system control program file are stored in the HPA area. Furthermore, the BIOS code file, the MBR code file, the trusted file and the system control program file are also stored in the HPA area, which are used for restoration when they are tampered. Hash values obtained by performing the hashing operation twice for the BIOS code file, the MBR code file, the trusted file and the system control program file are stored in the memory of a security chip, which are used for verifying before and after the computer is started, as described in detail below.

It should be noted that by way of an example, as shown in FIG. 1, a MBR code file storage area, a trustable file storage area and a HPA area are generally located in the hard disk, while the BIOS code file is located in a ROM of the computer. Additionally, the hash value obtained by the hashing operation which is performed twice is illustrated only as an example, and the present invention is not limited to this. Any times of the hashing operation are possible. Furthermore, it is not necessary for the BIOS code file, the MBR code file and the trusted file to be stored in HPA area, which may be stored in any form (such as a hard disk, a ROM, etc) of file backup area.

Figure 2:
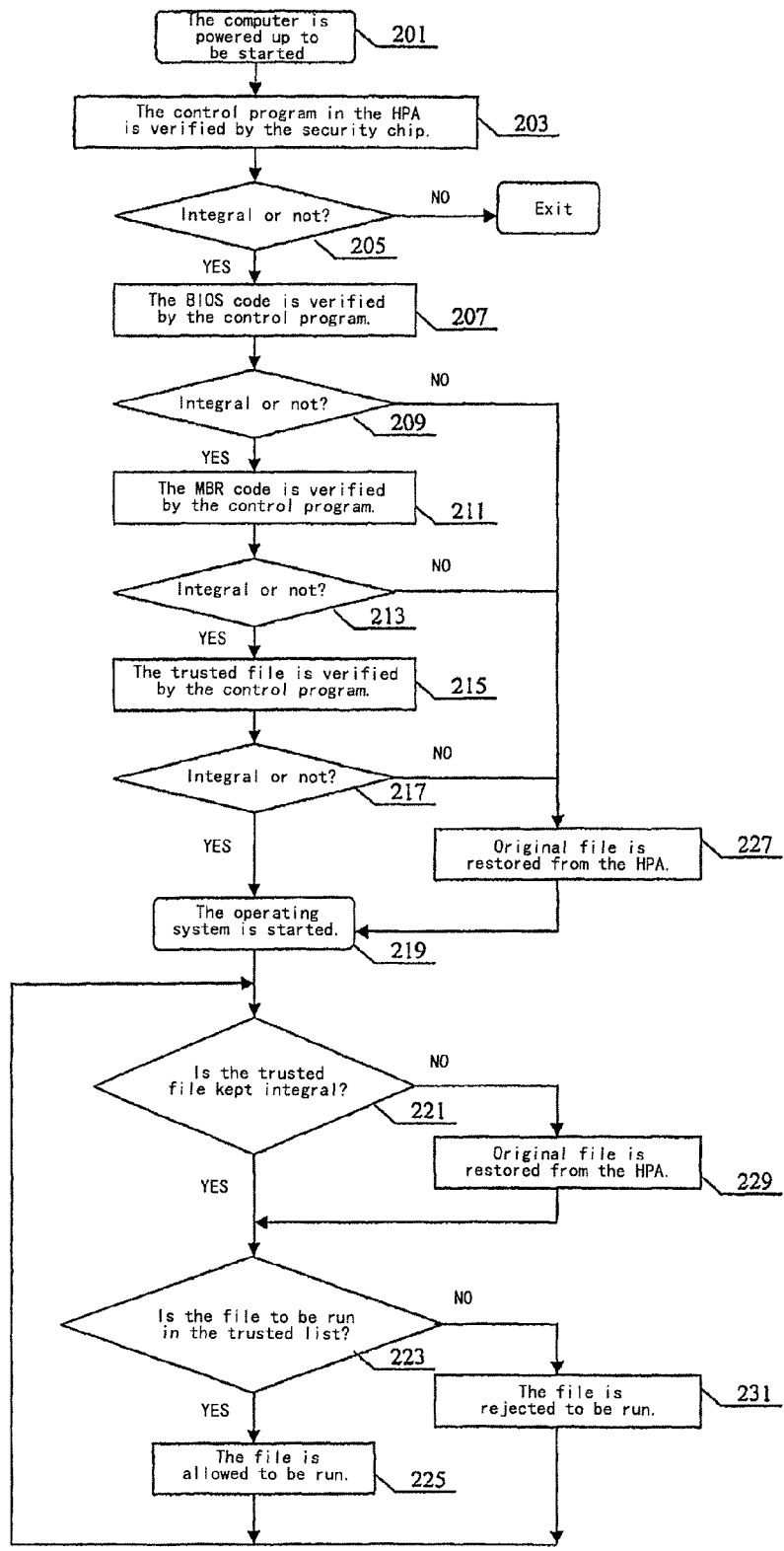
FIG. 2 is a flowchart illustrating the anti-virus method based on the security chip according to the present invention.

FIG. 2 is a flowchart illustrating the anti-virus method based on the security chip according to the present invention.

As illustrated in FIG. 2, when the computer is powered up to be started (step 201), a control program in the HPA is verified by the security chip, i.e. the security chip performs hashing operation twice (as described above) for the control program (step 203). Then, the hash value obtained by the hashing operation which is performed twice is compared with a hash value stored in the memory of the security chip (step 205). If they are different ("No" in step 205), the start of the computer is terminated and it exits. If they are identical ("Yes" in step 205), a control right is given to the control program, and the BIOS code file, the MBR (Master Boot Record) code file and the trusted file are verified by the control program, i.e. the hashing operation is performed for the BIOS code file, the MBR code file and the trusted file twice (step 207, step 211 and step 215). Then, the hash value obtained by the hashing operation which is performed twice is compared with the hash value stored in the security chip (step 209, step 213 and step 217), i.e. the integrity of the BIOS code file, the MBR code file and the trusted file is checked. If they are different ("No" in step 209, step 213 and step 217), the damaged BIOS code file, MBR code file and trusted file are restored (step 227), i.e. the damaged BIOS code file, MBR code file and trusted file are restored by corresponding backup files in the HPA. Thus, it may be guaranteed that a BIOS/MBR/operating system is restored into a normal state before the operating system is started, so that the influence of viruses may be eliminated directly, the known and unknown viruses may be defended effectively, in order to ensure the operating system to be started safely.

After the operating system is started (step 219), the system control program monitors state of the trusted file in real-time (step 221). That is to say, the hash value of the trusted file obtained by the hashing operation which is performed twice is compared with the corresponding hash value stored in the memory of the security chip, in order to check the integrity of the trusted file. If the hash value is not in accordance with the hash value stored in the security chip ("No" in step 221), it may be restored or updated automatically according to the selection of the user (step 229). The restoration process is similar to the restoration process as described above. On the contrary, if they are in accordance with each other ("Yes" in step 221), it is checked whether the file to be run is in the trusted list (step 223). If the file is not in the trusted list ("No" in step 223), it may not be run according to the selection of the user (step 231). This approach may achieve the purpose for defending the known or unknown viruses without depending on the virus feature library, so that various viruses can not be run in the system. On the contrary, if the program exists in the trusted list ("Yes" in step 223), the program is allowed to be run.

It should be noted that two hashing functions used by the hashing operation which is performed twice as mentioned above may be either identical or different.

According to the present invention, the security chip is used to store system key information, which is of high security and may guarantee the security of the HPA, and an integrity measurement approach at the hard drive level may be provided. Furthermore, in the present invention, independent of the protected operating system, the integrity measurement is performed to the key sectors on system start-up (such as the hard disk information and the operating system core file) sequentially since BIOS, which may provide a protection in a lower-level and more thoroughly than common anti-virus software.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. An anti-virus method based on a security chip, comprising steps of:
storing, in a memory of the security chip, a hash value obtained by a hashing operation for a computer key file and a system control program; and storing, in a backup storage area, a backup file of the computer key file; wherein the computer key file comprises a BIOS code file, a MBR part code file, and a trusted file;
verifying integrity of the system control program by using the hash value of the system control program stored in the memory of the security chip, when a computer is powered up, wherein the system control program serves, once verified to be integral, as a root of trust for verifying the computer key file;
if and only if the system control program is verified to be integral, executing a control by the system control program for verifying integrity of the computer key file with the hash value of the computer key file stored in the memory of the security chip;
if all the computer key files are integral, starting an operating system; and
on the contrary, if any of the computer key files is not integral, restoring the computer key file by using the backup file of the computer key file stored in the backup storage area.

2. The method according to claim 1, wherein the step of verifying the integrity of the computer key file by the system control program with the hash value of the computer key file stored in the memory of the security chip comprises a step of: verifying integrity of the BIOS code file, the MBR code file and the trusted file sequentially, by the system control program, with respective hash values of the BIOS code file, the MBR part code file and the trusted file stored in the memory of the security chip.

3. The method according to claim 1, wherein the backup storage area is a hard disk protected area.

4. The method according to claim 1, wherein the method further comprises steps of: verifying the integrity of the trusted file in real-time, by the system control program, with the hash value of the trusted file stored in the memory of the security chip, when the operating system is started; if the trusted file is integral and a file which is to be run exists in a trusted list, allowing running of the file which is to be run; otherwise, forbidding the running of the file which is to be run.

5. The method according to claim 1, wherein the step of verifying the integrity of the system control program by using the hash value of the system control program stored in the memory of the security chip comprises steps of: obtaining a hash value of a current system control program by performing a hashing operation on the current system control program which is the same as said hashing operation; comparing the hash value with the hash value of the system control program stored in the memory of the security chip; and if the two hash values are in accordance with each other, it indicates that the current system control program is integral.

6. The method according to claim 1, wherein the step of verifying the integrity of the backup file of the computer key file with the hash value of the computer key file stored in the memory of the security chip comprises a step of: obtaining a hash value of a current computer key file by performing a hashing operation on the current computer key file which is the same as said hashing operation; comparing this hash value with the hash value of the computer key file stored in the memory of the security chip; and if the two hash values are in accordance with each other, it indicates that the current computer key file is integral.

7. The method according to claim 1, wherein the hash value stored in the memory of the security chip is obtained by performing hashing operation twice.

8. The method according to claim 1, wherein two hashing functions are identical in the hashing operation which is performed twice.

9. The method according to claim 1, wherein two hashing functions are different in the hashing operation which is performed twice.

10. The method according to claim 1, wherein the trusted file is a clean operating system core file.

11. The method according to claim 1, wherein the memory of the security chip is protected by authentication of the security chip.

* * * * *